(12) United States Patent
Shimomura

(10) Patent No.: US 7,679,802 B2
(45) Date of Patent: Mar. 16, 2010

(54) OPTICAL SCANNER CONFIGURED SO A PRINCIPAL RAY OF AN INCIDENT BEAM FROM A LIGHT SOURCE TO A DEFLECTOR AND A PRINCIPAL RAY OF A SCANNING BEAM FROM THE DEFLECTOR TO A SCANNED SURFACE TRAVEL ON OPPOSITE SIDES OF AN OPTICAL AXIS OF OPTICAL ELEMENT(S) HAVING TRANSMISSIVE SURFACES BOTH CONCAVE TOWARD THE DEFLECTOR IN SUB-SCANNING SECTION, AND IMAGE FORMING APPARATUS USING THE SAME

(75) Inventor: Hidekazu Shimomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/250,478

(22) Filed: Oct. 13, 2008

(65) Prior Publication Data

US 2009/0046343 A1      Feb. 19, 2009

Related U.S. Application Data

(63) Continuation of application No. 11/219,263, filed on Sep. 1, 2005, now Pat. No. 7,453,616.

(30) Foreign Application Priority Data

Sep. 7, 2004      (JP)      ............................. 2004-259913

(51) Int. Cl.
    *G02B 26/08*      (2006.01)

(52) U.S. Cl. .................................... 359/206.1; 347/259
(58) Field of Classification Search ... 359/196.1–226.3; 347/259
See application file for complete search history.

(56) References Cited

U.S. PATENT DOCUMENTS

| 6,191,801 | B1 | 2/2001 | Hiraoka et al. |
| 6,678,493 | B2* | 1/2004 | Maeyama et al. ........... 399/302 |
| 2001/0012043 | A1* | 8/2001 | Yamawaki et al. .......... 347/129 |
| 2003/0128413 | A1 | 7/2003 | Suzuki et al. |
| 2004/0109213 | A1 | 6/2004 | Takeuchi et al. |

FOREIGN PATENT DOCUMENTS

JP      06-35212 Y      9/1994

* cited by examiner

*Primary Examiner*—Alessandro Amari
*Assistant Examiner*—Jennifer L. Doak
(74) *Attorney, Agent, or Firm*—Canon U.S.A., Inc. I.P. Division

(57) ABSTRACT

Optical scanners are configured so a principal ray of an incident beam from a light source device to a deflector and a principal ray of a scanning beam from the deflector to a scanned surface travel on the opposite sides of an optical axis of an optical element(s) wherein entrance and exit surfaces of the optical element(s) are both concave toward the deflector in the sub-scanning section. Embodiments may beneficially separate the scanning beam from ghost light and/or be incorporated in image forming apparatuses.

3 Claims, 11 Drawing Sheets

OPTICAL SCANNER CONFIGURED SO A PRINCIPAL RAY OF AN INCIDENT BEAM FROM A LIGHT SOURCE TO A DEFLECTOR AND A PRINCIPAL RAY OF A SCANNING BEAM FROM THE DEFLECTOR TO A SCANNED SURFACE TRAVEL ON OPPOSITE SIDES OF AN OPTICAL AXIS OF OPTICAL ELEMENT(S) HAVING TRANSMISSIVE SURFACES BOTH CONCAVE TOWARD THE DEFLECTOR IN SUB-SCANNING SECTION, AND IMAGE FORMING APPARATUS USING THE SAME

CROSS REFERENCE TO RELATED APPLICATIONS

This application is a continuation of U.S. application Ser. No. 11/219,263 filed Sep. 1, 2005, which claims the benefit of Japanese Patent Application No. 2004-259913 filed Sep. 7, 2004, both of which are hereby incorporated by reference herein in their entirety.

FIELD OF THE INVENTION

The present invention relates to an optical scanner and an image forming apparatus using the same. In particular, though not exclusively, the present invention relates to an optical scanner suitable for an image forming apparatus having an electrophotographic process.

DESCRIPTION OF THE RELATED ART

In a conventional optical scanner used in a laser beam printer (LBP) and so on, a light beam that is optically modulated in accordance with an image signal and emitted from a light source device is periodically deflected by a light deflector, for example, a rotating polygon mirror. The light beam is converged into a spot on a surface of a photosensitive recording medium (photosensitive drum) by a scanning optical system having fθ characteristics, and then the surface of the recording medium is optically scanned to carry out image recording.

FIG. 10 illustrates a schematic view of a conventional optical scanner.

In FIG. 10, a light source device 201 emits a diverging beam. A collimator lens 203 converts the diverging beam into a substantially parallel beam. The beam is limited by a stop 202 and enters a cylindrical lens 204, which has a predetermined refractive power only in the sub-scanning direction. The substantially parallel beam exits the cylindrical lens 204 without being changed in the main scanning section. On the other hand, the beam converges in the sub-scanning section. Therefore, the beam forms a substantially linear image on a deflecting surface (reflecting surface) 205a of a deflecting device 205, which is a polygon mirror.

The beam deflected by the deflecting surface 205a of the deflecting device 205 is guided by a scanning lens system 206 having fθ characteristics, onto a photosensitive drum surface 208 as a surface to be scanned. The deflecting device 205 rotates in the direction shown by arrow A so that the photosensitive drum surface 208 is optically scanned in the direction shown by arrow B. In this way, image information is recorded.

In order for such an optical scanner to perform highly accurate recording of data information, for example, the following conditions need to be satisfied:

(1) field curvature is reduced throughout the surface to be scanned;
(2) distortion characteristics between a field angle θ and an image height Y are fθ characteristics, which enable constant-speed scanning; and
(3) the spot diameter on the image plane is uniform at every image height.

In plastic lenses, a designed aspherical surface can be formed. In addition, plastic lenses are inexpensive. Recently, plastic lenses have been commonly used in scanning optical systems.

FIGS. 11 and 12 illustrate schematic sectional views showing ghost light generated in a scanning optical system. FIG. 11 illustrates a schematic sectional view in the main scanning direction (main scanning sectional view). FIG. 12 is a schematic sectional view in the sub-scanning direction (sub-scanning sectional view).

The scanning optical system 216 is an overfilled scanning optical system, in which the width of an incident beam in the main scanning direction is larger than the width of a deflecting surface (reflecting surface) 215a of a polygon mirror 215. As shown in FIGS. 11 and 12, a beam emitted from a light source device 211 is bent by a returning mirror 217. In the main scanning section, the beam is incident on the polygon mirror 215 from a direction substantially corresponding to the optical axis of the scanning optical system 216 (front incidence). In the sub-scanning section, the beam is incident on the polygon mirror 215 from an oblique direction with respect to a plane perpendicular to the rotation axis of the polygon mirror 215 (oblique incidence optical system).

The incident beam Ri travels from the light source device 211 to the polygon mirror 215. As shown in FIG. 12, when the incident beam Ri passes through part of the scanning optical system 216, it is partly reflected by a surface 262a of a scanning lens 262 constituting the scanning optical system 216 to generate ghost light Rf.

Although there are various types of ghost light, this ghost light is so-called stationary ghost light, which can be in the center of the image independently of deflection angle of the polygon mirror. This stationary ghost light stays in the center of the image all the while the length of the image is scanned with the real scanning light (scanning beam) Rs. Therefore, although the quantity of the ghost light itself is small, it is accumulated on the photosensitive drum surface 218 and can become larger than the quantity of the real scanning light Rs. The area on which the ghost light Rf is incident is developed into a dark line, thereby deteriorating the image quality.

Japanese Utility Model Publication No. 6-35212 discusses an optical scanner for reducing this ghost light.

In this document, the ghost light problem is reduced by disposing a light blocking member for blocking the ghost light in a position such that the light blocking member does not obstruct the incident beam and the scanning beam.

However, in the case of an optical system in which the ghost light and the scanning beam are not sufficiently separated, it is difficult to completely block the ghost light with the light blocking member. Therefore, other measures can be taken. For example, antireflection coating is applied to the surface of the scanning lens.

However, it is difficult to apply antireflection coating to plastic lenses, which are commonly used. In addition, application of antireflection coating increases the cost.

SUMMARY OF THE INVENTION

At least one exemplary embodiment is directed to an optical scanner including a first optical system for guiding a light beam emitted from a light source device (incident beam) to a deflecting device, and a second optical system for guiding a light beam deflected by the deflecting device (scanning beam) to a surface to be scanned. The incident beam passes through at least one of imaging optical elements constituting the second optical system, and is obliquely incident on a deflecting surface of the deflecting device in the sub-scanning section. Both the principal ray of the incident beam and the principal ray of the scanning beam travel on one of the upper and lower sides of the optical axis of the at least one imaging optical element. Both the entrance surface and the exit surface of the at least one imaging optical element are convex toward the deflecting device in the sub-scanning section.

In this exemplary embodiment, both the entrance surface and the exit surface of the at least one imaging optical element can be concave toward the deflecting device in the main scanning section.

The light source device can have a plurality of light emitters, and a plurality of light beams emitted from the plurality of light emitters can be incident on the same deflecting surface of the deflecting device.

The light source device can have two light emitters. In this case, one of two light beams emitted from the two light emitters can travel on one of the upper and lower sides of the optical axis of the at least one imaging optical element, the other light beam can travel on the other side, and the two light beams can be guided to different planes to be scanned.

In at least one exemplary embodiment, the at least one imaging optical element can be tilted in the sub-scanning section.

In at least one exemplary embodiment, the optical scanner can further include a light blocking member. The light blocking member can be disposed in the optical path of the second optical system and can block ghost light that is generated by the reflection of the incident beam from a surface of the at least one imaging optical element.

In at least one exemplary embodiment, the width of the incident beam in the main scanning direction can be larger than the width of the deflecting surface in the main scanning direction.

In yet a further exemplary embodiment, an optical scanner includes a first optical system for guiding a light beam emitted from a light source device (incident beam) to a deflecting device, and a second optical system for guiding a light beam deflected by the deflecting device (scanning beam) to a surface to be scanned. The incident beam passes through at least one of imaging optical elements constituting the second optical system, and is obliquely incident on a deflecting surface of the deflecting device in the sub-scanning section. The principal ray of the incident beam travels on one of the upper and lower sides of the optical axis of the at least one imaging optical element and the principal ray of the scanning beam travels on the other side. Both the entrance surface and the exit surface of the at least one imaging optical element are concave toward the deflecting device in the sub-scanning section.

In yet another exemplary embodiment, both the entrance surface and the exit surface of the at least one imaging optical element can be concave toward the deflecting device in the main scanning section.

In at least one exemplary embodiment, the at least one imaging optical element can be tilted in the sub-scanning section.

In at least one exemplary embodiment, the optical scanner can further include a light blocking member. The light blocking member can be disposed in the optical path of the second optical system and can block ghost light that is generated by the reflection of the incident beam from a surface of the at least one imaging optical element.

In at least one exemplary embodiment, the width of the incident beam in the main scanning direction can be larger than the width of the deflecting surface in the main scanning direction.

In further exemplary embodiments, the optical scanner can be incorporated in an image forming apparatus. The image forming apparatus can include a photoreceptor disposed on a surface to be scanned. The optical scanner can scan the photoreceptor with a light beam to form an electrostatic latent image. The image forming apparatus can further include a developer developing the latent image into a toner image, a transferor transferring the developed toner image onto a recording medium, and a fuser fusing the transferred toner image to the recording medium.

In further exemplary embodiments, the optical scanner can be incorporated in an image forming apparatus. The image forming apparatus can include a printer controller that converts code data input from an external device into an image signal and inputs the image signal into the optical scanner.

In at least one exemplary embodiment, the optical scanner can be incorporated in a color image forming apparatus. The color image forming apparatus can include a plurality of image carriers that are disposed in planes to be scanned by the optical scanner and form images in different colors.

In at least one exemplary embodiment, the color image forming apparatus can further include a printer controller that converts color signals input from an external device into image data in different colors and inputs the image data into the optical scanner.

When the incident beam passes through at least one scanning optical element constituting the scanning optical system, the incident beam is partly reflected by the surface of the scanning optical element, thereby generating ghost light. At least one exemplary embodiment reduces ghost light from being incident on the surface to be scanned, by appropriately setting components of the optical scanner. Therefore, the exemplary embodiment is directed to an optical scanner that can produce a higher-quality image and an image forming apparatus using the same.

Further features of the present invention will become apparent from the following description of exemplary embodiments (with reference to the attached drawings).

DESCRIPTION OF THE EMBODIMENTS

Figure 1:
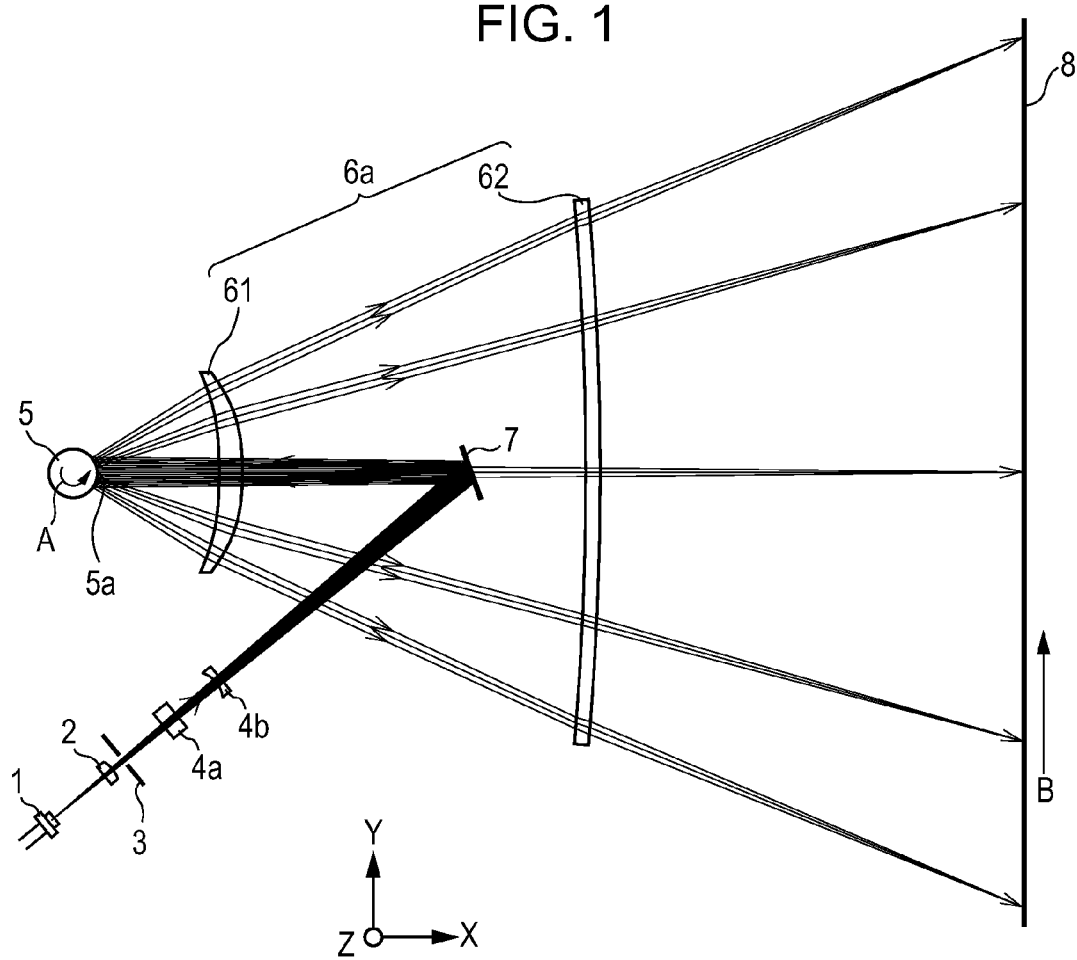
FIG. 1 illustrates a main scanning sectional view of an optical scanner according to exemplary embodiment 1.

The following description of exemplary embodiment(s) is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate. For example member formation and manufacturing may not be discussed in detail; however such processes as known by one of ordinary skill in the art and equivalent methods, processes, and materials would fall within the intended scope of exemplary embodiments. For example, materials used for and positioning of optical elements (e.g., lens and mirrors) may not be discussed but materials and positioning techniques as known by one of ordinary skill in the relevant arts is intended to lie within the scope of exemplary embodiments.

Additionally the actual size of optical elements may not be discussed however any size from macro lenses to nano lenses are intended to lie within the scope of exemplary embodiments (e.g., lenses with diameters of nanometer size, micro size, centimeter size, and meter sizes).

Notice that similar reference numerals and letters refer to similar items in the following figures, and thus once an item is defined in one figure, it may not be discussed for following figures.

Exemplary embodiments of the present invention will now be described with reference to the drawings.

In exemplary embodiments, imaging optical elements include a refractive optical element (e.g., a lens), and a diffractive optical element (e.g., a lens with a diffraction grating).

Exemplary Embodiment 1

Figure 2:
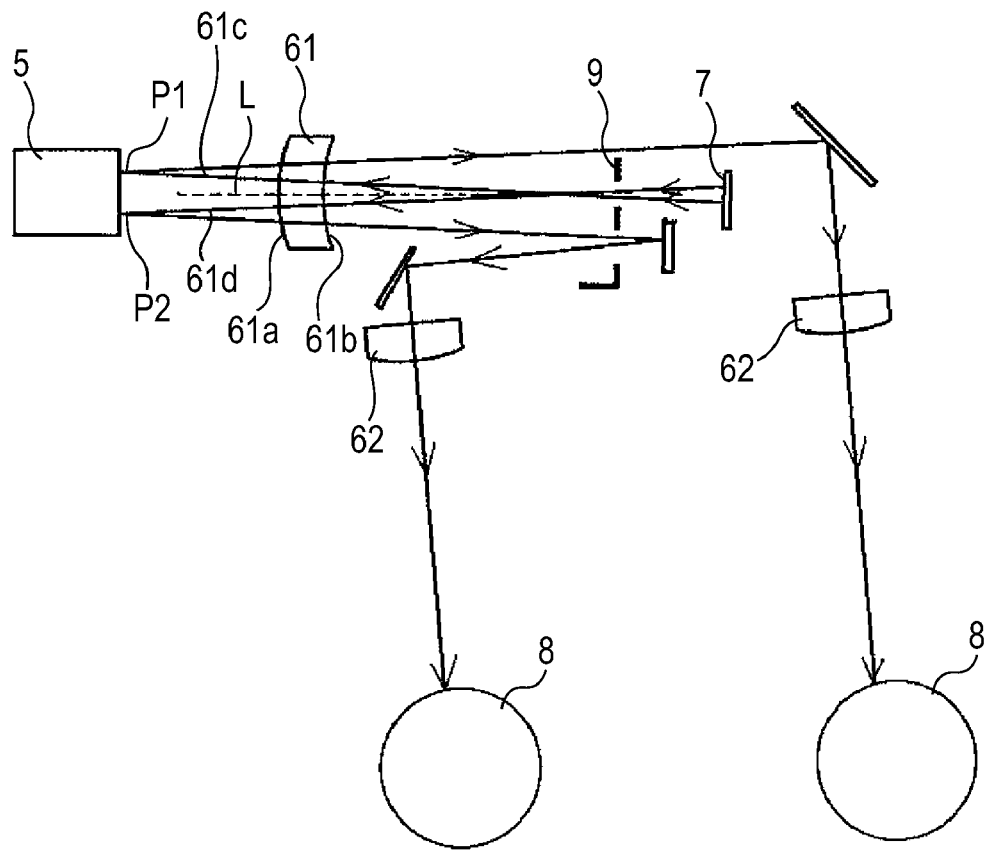
FIG. 2 illustrates a sub-scanning sectional view of the optical scanner according to exemplary embodiment 1.

FIG. 1 illustrates a schematic sectional view of an optical scanner according to exemplary embodiment 1 in the main scanning direction (main scanning sectional view). FIG. 2 illustrates a schematic sectional view of the optical scanner according to exemplary embodiment 1 in the sub-scanning direction (sub-scanning sectional view).

Here, the term "main scanning direction" refers to a direction perpendicular to the rotation axis of the light deflector and the optical axis of the scanning optical system (a direction in which a light beam is swept by the light deflector). The term "sub-scanning direction" refers to a direction parallel to the rotation axis of the light deflector. The term "main scanning section" refers to a plane that is parallel to the main scanning direction and includes the optical axis of the scanning optical system. The term "sub-scanning section" refers to a plane perpendicular to the main scanning section.

In FIG. 1, reference numeral 1 denotes two light source devices, which are arrayed vertically (a direction in and out of the paper in FIG. 1) (only the upper one is shown). In the present exemplary embodiment, each light source device has a single light emitter. However, exemplary embodiments are not limited to this. Alternatively, each light source device may be a multiple semiconductor laser having two or more light emitters.

Reference numeral 2 denotes a beam converter (e.g., collimator lens), which converts the two light beams emitted from the light source devices 1 into substantially parallel light beams (or diverging beams or converging beams). Reference numeral 3 denotes an aperture stop, which limits the beams passing through it to the sub-scanning direction to shape the beams. Reference numeral 4a denotes a cylindrical lens that has a predetermined power (refractive power) only in the main scanning section. Reference numeral 4b denotes an anamorphic lens that has a negative power in the main scanning section and a positive power in the sub-scanning section. Reference numeral 5 denotes a light deflector (e.g., one having a plurality of deflecting surfaces). In the present exemplary embodiment, the light deflector can be a rotating polygon mirror having multiple (e.g., ten) surfaces, and is rotated in the direction shown by arrow A in FIG. 1 at a constant velocity by a driving device (not shown) (e.g., a motor). The cylindrical lens 4a and the anamorphic lens 4b make the two collimated light beams form substantially linear images on the deflecting surface (reflecting surface) 5a of the light deflector 5, in the sub-scanning section. Reference numeral 7 denotes a turning mirror, which reflects the two light beams toward the light deflector 5.

The collimator lens 2, the aperture stop 3, the cylindrical lens 4a, the anamorphic lens 4b, the turning mirror 7, and a first scanning lens 61 (as will hereinafter be described) constitute an incident optical system as a first optical system.

In the present exemplary embodiment, two light beams emitted from the light source devices 1 are made incident on the deflecting surface 5a of the light deflector 5 by the incident optical system, in the main scanning section. The width of the incident beams can be larger than the width of the deflecting surface 5a (overfilled optical system). The spot diameter in the main scanning direction is determined by the focal length in the main scanning direction of a scanning optical system 6a (as will hereinafter be described) and the area of the deflecting surface 5a.

Reference numeral 6a denotes a scanning optical system (i.e., an imaging optical system (fθ lens system)) as a second optical system having a collecting function and fθ characteristics. The imaging optical system 6a has two (first and second) scanning lenses (fθ lenses) 61 and 62 formed of plastic material. The beams based on the image information are deflected by the light deflector 5 and then form spot images on their respective photosensitive drum surfaces 8 (as surfaces to be scanned) through the imaging optical system 6, in the main scanning section. In addition, the imaging optical system 6a makes a substantially optically conjugate relationship between the deflecting surface 5a of the light deflector 5 and the photosensitive drum surfaces 8, in the sub-scanning section. In this way, the imaging optical system 6a has a tilt reduction function. In the present exemplary embodiment, both the entrance surface 61a and the exit surface 61b of the first scanning lens 61 are convex toward the light deflector 5.

The present exemplary embodiment has a double path configuration, that is to say, the two light beams incident on the light deflector 5 (incident beams) pass through the first scanning lens (imaging lens) 61, and the two light beams reflected by the light deflector 5 (scanning beams) enter the first scanning lens 61 again.

In the present exemplary embodiment, when the principal ray of an incident beam travels on one of the upper and lower sides of the optical axis of the first scanning lens 61, the principal ray of the corresponding scanning beam travels on the same side.

Reference numeral 8 denotes photosensitive drum surfaces as surfaces to be scanned. Each surface 8 is scanned with a spot at a constant speed.

Reference numeral 9 (FIG. 2) denotes a light blocking member having slits. When the incident beams pass the first scanning lens 61, the beams are partly reflected by the front surface 61a or/and the back surface 61b of the first scanning lens 61 to generate ghost light. The light blocking member 9 reduces ghost light from being incident on the photosensitive drum surfaces 8.

In the present exemplary embodiment, the two divergent light beams emitted from the light source devices 1 are converted into substantially parallel light beams by the collimator lens 2, are limited by the aperture stop 3, enter the cylindrical lens 4a, and then enter the anamorphic lens 4b. The two substantially parallel light beams pass through the cylindrical lens 4a and the anamorphic lens 4b and converge in the sub-scanning section. The beams are reflected by the turning mirror 7, and then pass through the first scanning lens 61 (double path configuration). The beams fall on the deflecting surface 5a of the light deflector 5 and form substantially linear images (extending in the main-scanning direction) near the deflecting surface 5a. At this time, the two beams fall on the deflecting surface 5a at a predetermined angle (oblique incidence optical system). The two beams in the main scanning section are limited by the aperture stop 3 without being changed and then pass through the first scanning lens 61 via the turning mirror 7. The two beams fall on the deflecting surface 5a substantially along the center line of the deflection angle of the light deflector 5 (front incidence). Where the deflection angle is defined as the angle the normal of deflecting surface 5a makes with a plane parallel to the plane of the main scanning section. The width of the two substantially parallel light beams is sufficiently large relative to the facet width of the deflecting surface 5a of the light deflector 5, in the main-scanning direction (overfilled optical system).

The two beams reflected and deflected by the deflecting surface 5a of the light deflector 5 form spot images on their respective photosensitive drum surfaces 8 through the first scanning lens 61 and the second scanning lenses (imaging lenses) 62. With the rotation of the light deflector 5 in the direction shown by arrow A, the beams optically scan the photosensitive drum surfaces 8 in the direction shown by arrow B (main scanning direction). In this way, images are recorded on the photosensitive drum surfaces 8 as recording media.

Table 1 shows numerical values of the optical scanner of the present exemplary embodiment.

Note that the returning mirror 7 is omitted from

TABLE 1 angle of oblique incidence in sub-scanning section 1.5

| | Surface | R | D | N |
|---|---|---|---|---|
| Light source 1 | 1 | | 25.43 | 1.000 |
| Collimator lens 2 | 2 | ∞ | 3.00 | 1.762 |
| | 3 | −20.635 | 5.00 | 1.000 |
| Aperture stop 3 | 4 | ∞ | 18.10 | 1.000 |
| Cylindrical lens 4a | 5 | aspherical surface (see below) | 7.00 | 1.511 |
| | 6 | ∞ | 18.10 | 1.000 |
| Anamorphic lens 4b | 7 | aspherical surface (see below) | 3.00 | 1.524 |
| | 8 | ∞ | 193.46 | 1.000 |
| First scanning lens 61 | 9 | reversed shape of surface 13 | 8.50 | 1.524 |
| | 10 | reversed shape of surface 12 | 44.50 | 1.000 |
| Deflecting surface 5a | 11 | ∞ | 44.50 | 1.000 |
| First scanning lens 61 | 12 | Aspherical surface (see below) | 8.50 | 1.524 |
| | 13 | Aspherical surface (see below) | 120.50 | 1.000 |
| Second scanning lens 62 | 14 | Aspherical surface (see below) | 5.50 | 1.524 |
| | 15 | Aspherical surface (see below) | 150.00 | 1.000 |
| Surface to be scanned 8 | 16 | ∞ | | | aspherical shape

| | | Surface 5 | Surface 7 | Surface 12 | Surface 13 | Surface 14 | Surface 15 |
|---|---|---|---|---|---|---|---|
| Meridional shape | R | 35.993 | −9.16E+00 | −1.05E+02 | −6.06E+01 | −1.11E+03 | 6.14E+04 |
| | K | 0 | 0 | 3.04E+00 | −3.01E−01 | 0 | −3.87E+04 |
| | B4 | 0 | 0 | 6.60E−07 | 2.61E−07 | 0 | −7.66E−08 |
| | B6 | 0 | 0 | −1.94E−10 | −8.85E−11 | 0 | 2.82E−12 |
| | B8 | 0 | 0 | 5.92E−14 | −5.65E−14 | 0 | −7.62E−17 |
| Sagittal shape | r | ∞ | 3.59E+02 | 1.00E+03 | 1.00E+03 | 1.00E+03 | −4.41E+01 |
| | D2 | 0 | 0 | 0 | 0 | 0 | 2.72E−05 |
| | D4 | 0 | 0 | 0 | 0 | 0 | −1.91E−09 |
| | D6 | 0 | 0 | 0 | 0 | 0 | 1.13E−13 |
| | D8 | 0 | 0 | 0 | 0 | 0 | −2.95E−18 |

In the present exemplary embodiment, the meridional shapes of the entrance surfaces and the exit surfaces of the first and second scanning lenses are aspherical shapes that can be expressed by functions of up to 10th-order. When the intersection between each scanning lens and the optical axis is an origin, the optical axis direction is the x-axis, and a direction perpendicular to the optical axis in the main scanning section is the y-axis, the shape in the meridional direction corresponding to the main scanning direction is expressed by the following formula:

[Formula 1]

$$X = \frac{\frac{Y^2}{R}}{1+\sqrt{1-(1+k)\left(\frac{Y}{R}\right)^2}} +$$

$$B4 \times Y^4 + B6 \times Y^6 + B8 \times Y^8 + B10 \times Y^{10}$$

where R is the meridional radius of curvature, and K, B4, B6, B8, and B10 are aspherical coefficients.

The shape in the sagittal direction corresponding to the sub-scanning direction is expressed by the following formula:

$$S = \frac{\frac{Z^2}{Rs^*}}{1 + \sqrt{1 - \left(\frac{Z}{Rs^*}\right)^2}}$$ [Formula 2]

S is the sagittal shape defined in a plane that includes the normal of the meridional line in each position in the meridional direction and is perpendicular to the main scanning section.

A radius of curvature in the sub-scanning direction (sagittal radius of curvature) Rs at a position that is at a distance of Y from the optical axis in the main scanning direction is expressed by the following formula:

$$Rs^* = Rs \times (1 + D2 \times Y^2 + D4 \times Y^4 + D6 \times Y^6 + D8 \times Y^8 + D10 \times Y^{10})$$ [Formula 3]

where Rs is the sagittal radius of curvature on the optical axis, and D2, D4, D6, D8, and D10 are sagittal change coefficients.

Although the shape of the surface can be defined by the above formula in the present exemplary embodiment, other exemplary embodiments are not limited to this.

In the present exemplary embodiment, in order to achieve such aspherical shapes, both the first and second scanning lenses 61 and 62 can be plastic lenses made by, e.g., injection molding.

In the present exemplary embodiment, as shown in FIG. 2, two beams are emitted from two light emitters (not shown). One of the principal rays of the two light beams travels on the upper side (e.g., 61c, toward the top of the page in FIG. 2) and one on the lower (e.g., 61d, toward the bottom of the page in FIG. 2) side of the optical axis L of the first scanning lens 61. The two light beams are bent into the main scanning direction by the common turning mirror 7, pass through the common first scanning lens 61, and then fall on different positions P1 and P2 on the common light deflector 5. The two light beams are deflected by the light deflector 5, and then guided to their respective portions on the photosensitive drum surfaces 8 by the first and second scanning lenses 61 and 62.

The light source devices 1 can have various frequencies, thus the two described in the above non-limiting example can have different frequencies (i.e., color). Thus for four color scanning two of the optical scanners illustrated in FIG. 2 can be used to constitute a color image forming apparatus that uses four colors C (cyan), M (magenta), Y (yellow), and B (black).

Figure 3:
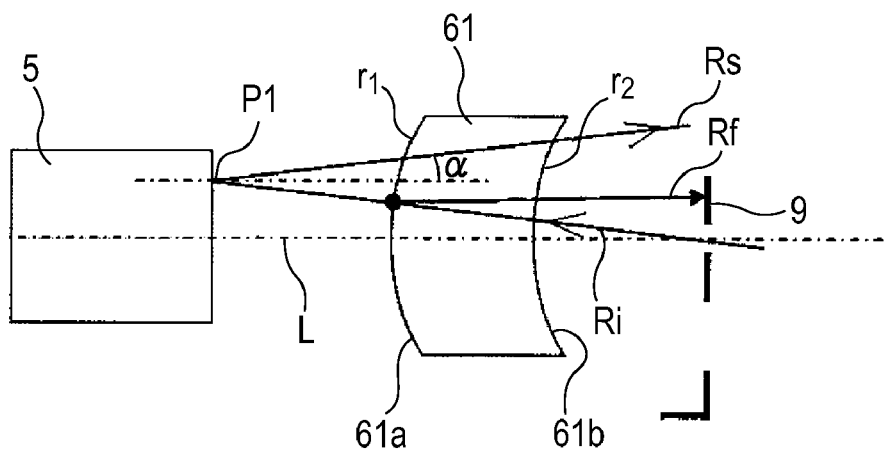
FIG. 3 illustrates ghost light in exemplary embodiment 1.

FIG. 3 illustrates an enlarged view of the first scanning lens 61 and its vicinity in FIG. 2. In FIG. 3, the same reference numerals are used to designate the same components as those in FIG. 2.

In FIG. 3, reference character Ri denotes a beam incident on the deflecting surface of the light deflector 5 (incident beam). Reference character Rs denotes a beam deflected by the light deflector 5 (scanning beam). When the incident beam Ri passes through the first scanning lens 61, it is partly reflected by the lens surface 61a to generate ghost light Rf.

In the present exemplary embodiment, as described above, one of two incident beams Ri travels on one of the upper and lower sides of the optical axis L of the first scanning lens 61, and the other travels on the other side. Since one of the upper and lower incident beams is the mirror image of the other (the optical axis L is the line of symmetry), only the upper incident beam Ri is shown in FIG. 3. In the present exemplary embodiment, as described above, the principal ray of the incident beam Ri and the principal ray of the scanning beam Rs travel on the same side of the optical axis L of the first scanning lens 61.

Features of at least a few exemplary embodiments will be described using comparative examples.

Comparative Examples

Figure 4A:
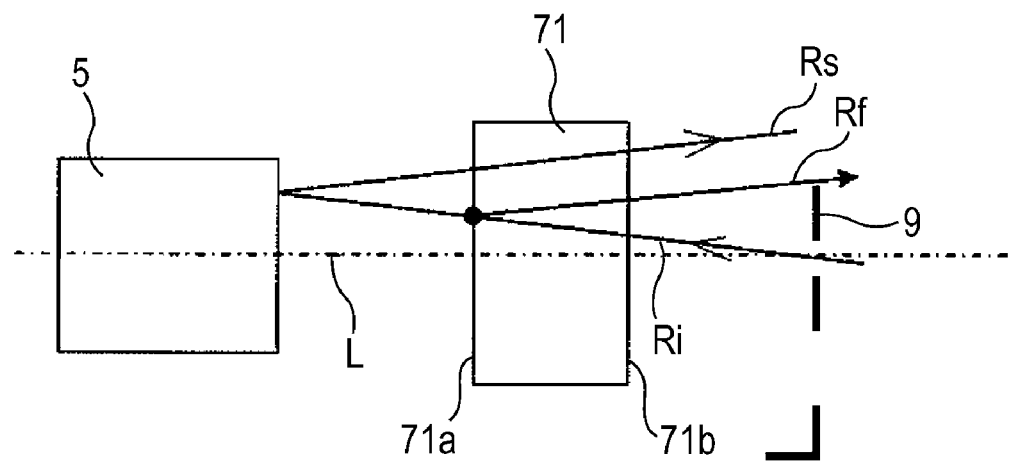
FIGS. 4A and 4B illustrate ghost light generated in comparative examples.
Figure 4B:
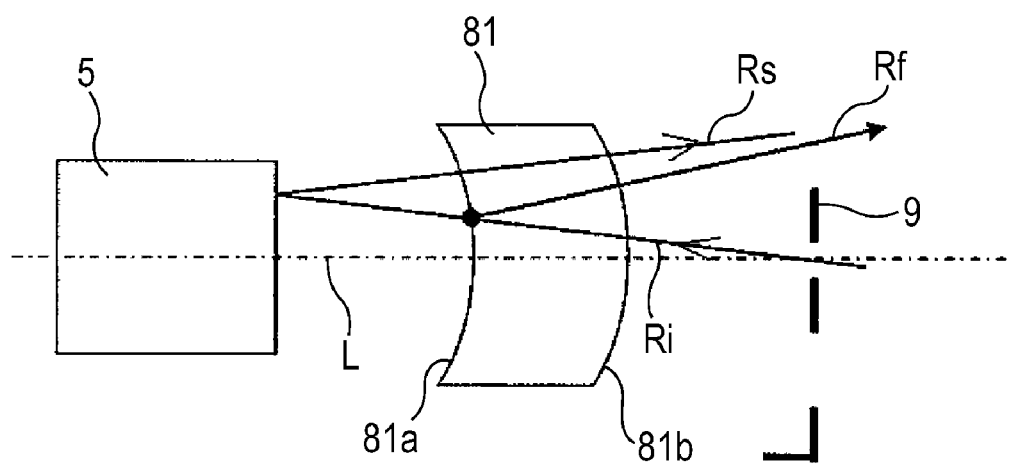

FIGS. 4A and 4B are sub-scanning sectional views showing comparative examples. They illustrate how ghost light is generated when the present exemplary embodiment is not used. In FIG. 4A, both the entrance surface 71a and the exit surface 71b of the first scanning lens 71 are flat. In FIG. 4B, both the entrance surface 81a and the exit surface 81b of the first scanning lens 81 are concave toward the light deflector 5.

In the present exemplary embodiment, as illustrated in FIG. 3, both the entrance surface 61a and the exit surface 61b of the first scanning lens 61 are convex toward the light deflector (polygon mirror) 5, and therefore, compared to the comparative examples (FIGS. 4A and 4B), the distance between the ghost light Rf and the scanning beam Rs is larger. Therefore, in the present exemplary embodiment, it is possible to ensure a margin between the scanning beam Rs and the light blocking member 9 for blocking the ghost light Rf.

Figure 5:
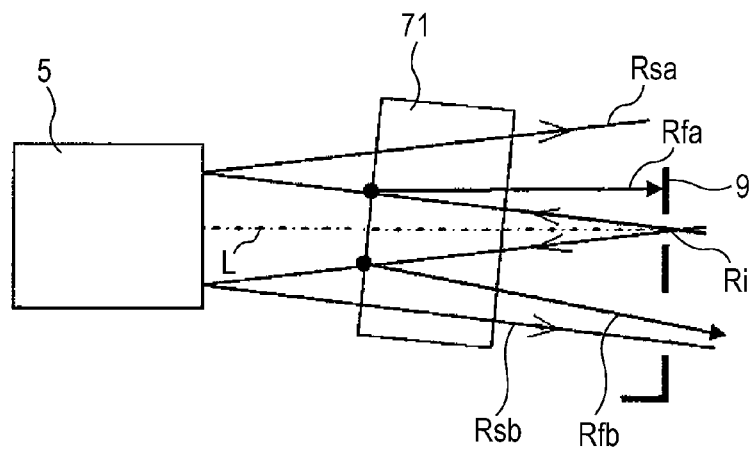
FIG. 5 illustrates ghost light generated in another comparative example.

FIG. 5 illustrates a sub-scanning sectional view in which the first scanning lens 71 of FIG. 4A is tilted at a predetermined angle, with respect to the optical axis L, in the sub-scanning section. In FIG. 5, a scanning beam Rs that travels on the upper side Rsa of the optical axis L is sufficiently apart from its ghost light Rfa. However, a scanning beam Rs that travels on the lower side Rsb of the optical axis L is close to its ghost light Rfb.

Therefore, in optical scanners such that one incident beam travels on one of the upper and lower sides of the optical axis L and the other incident beam travels on the other side as in the present exemplary embodiment, if the first scanning lens 71 is tilted in the sub-scanning section, the ghost light Rf and the scanning beam Rs cannot be separated.

Therefore, in the present exemplary embodiment, both the entrance surface 61a and the exit surface 61b of the first scanning lens 61 are convex toward the light deflector 5 so that both scanning beams Rs can be sufficiently separated from their respective ghost light Rf.

In the present exemplary embodiment, the projections of both the entrance surface 61a and the exit surface 61b of the first scanning lens 61 onto the plane of the main scanning section are concave toward the light deflector (polygon mirror) 5 as shown in FIG. 1, therefore, both lens surfaces of the first scanning lens 61 are barrel-shaped.

The smaller the radius of curvature of the first scanning lens 61 in the sub-scanning section, the larger the distance between the ghost light Rf and the scanning beam Rs. However, if the radius of curvature is too small, other problems can occur. For example, the spot rotates on the surface to be scanned.

Therefore, in the present exemplary embodiment, the radius of curvature of the entrance surface 61a (r1) and the radius of curvature of the exit surface 61b (r2) can satisfy the following conditions:

100<r1<10000

100<r2<10000

In yet another exemplary embodiment, they can satisfy the following conditions:

200<r1<5000
200<r2<5000

As described above, the present exemplary embodiment uses two incident beams (multi-beam). One of the two beams travels on one of the upper and lower sides of the optical axis L, and the other travels on the other side in the sub-scanning section. In other words, one incident beam travels on the opposite side of the optical axis than the side traveled by the other incident beam in the sub-scanning section. However, exemplary embodiments are not limited to this. A single incident beam may be used. In this case, the beam travels on either the upper or lower side of the optical axis L in the sub-scanning section. In this case, both the entrance surface and the exit surface of the first scanning lens (imaging lens) 61 are convex toward the light deflector 5 as in exemplary embodiment 1. In addition, the first scanning lens 61 is tilted in the sub-scanning section so that the ghost light Rf and the scanning beam Rs can be easily separated.

As described above, in the present exemplary embodiment, the ghost light Rf and the scanning beam Rs are apart from each other. Therefore, the ghost light Rf can be selectively blocked with the light blocking member 9.

The light blocking member 9 can be of various designs (e.g., a metal plate having slits). It is attached to a lens holder for holding the scanning optical system 6. Alternatively, the light blocking member 9 may be formed as a unit with a lens holder. Alternatively, the turning mirror 7 may function as the light blocking member 9. In this case, the ghost light is reflected toward the light source devices 1 and does not reach the surfaces to be scanned 8. Alternatively, the light blocking member can be a patterned (e.g., concentric ring) reflective film on the exit side 61b of the first scanning lens 61, where the initial light passes through the center of the pattern but any subsequent ghost light reflection is blocked by the portion of the reflective pattern having a reflective film.

In the present exemplary embodiment, both the entrance surface 61a and the exit surface 61b of the first scanning lens 61 are convex toward the light deflector 5. However, exemplary embodiments are not limited to this. Alternatively, at least one exemplary embodiment can have a first scanning lens 61 such that either the entrance surface or the exit surface is convex toward the light deflector (polygon mirror) 5.

Exemplary Embodiment 2

Figure 6:
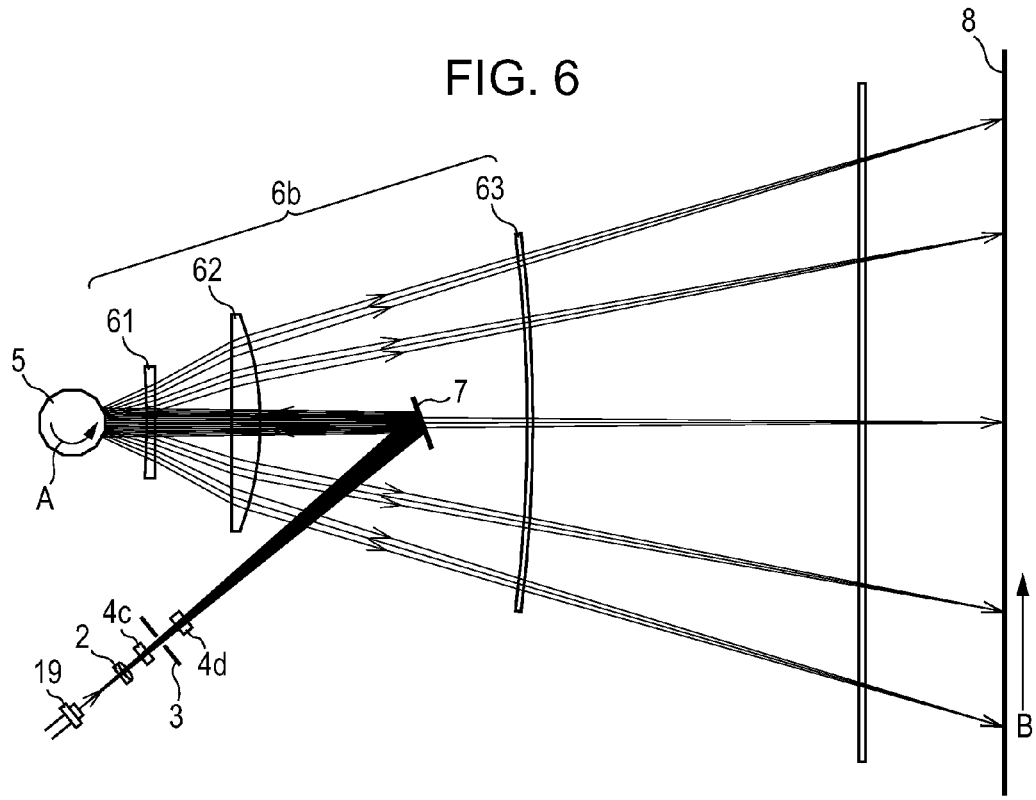
FIG. 6 illustrates a main scanning sectional view of an optical scanner according to exemplary embodiment 2.
Figure 7:
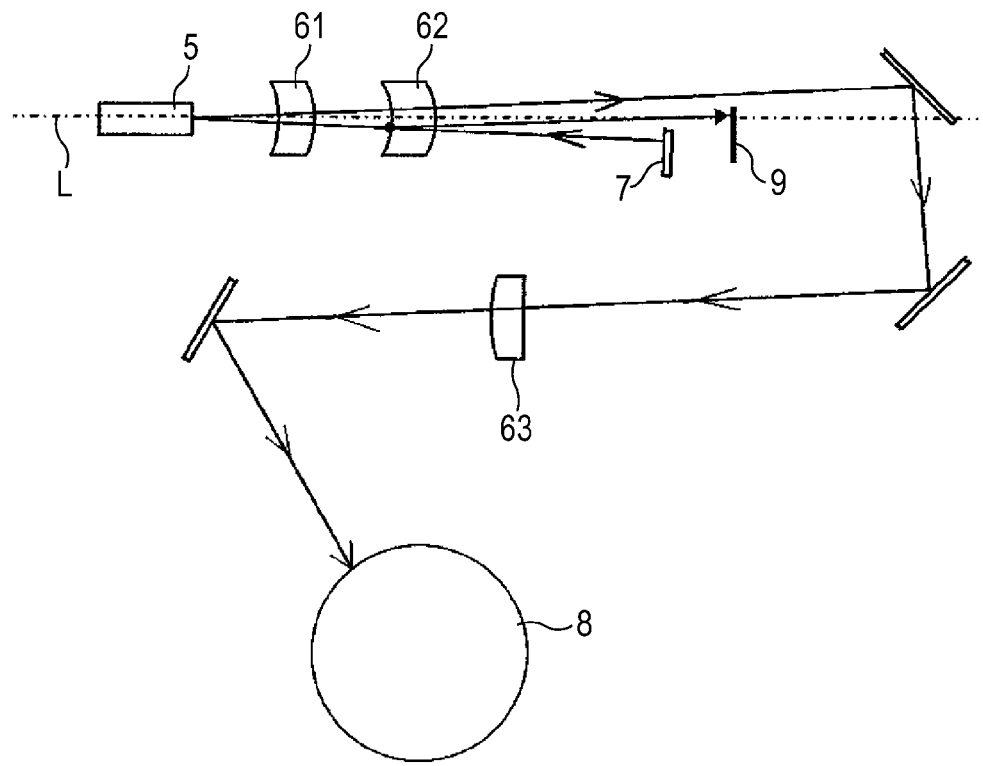
FIG. 7 illustrates a sub-scanning sectional view of the optical scanner according to exemplary embodiment 2.

FIG. 6 illustrates a schematic sectional view of an optical scanner according to exemplary embodiment 2 in the main scanning direction (main scanning sectional view). FIG. 7 illustrates a schematic sectional view of the optical scanner according to exemplary embodiment 2 in the sub-scanning direction (sub-scanning sectional view). In FIGS. 6 and 7, the same reference numerals are used to designate the same components as those in FIGS. 1 and 2.

The present exemplary embodiment differs from exemplary embodiment 1 in the following respects:
(1) the light source device has a single light emitter;
(2) the scanning optical system 6b has three (first, second, and third) scanning lenses 61, 62, and 63;
(3) the first and second scanning lenses 61 and 62 are formed of a material with similar optical properties as glass;
(4) one of the principal rays of the incident beam and the principal ray of the scanning beam travels on one of the upper and lower side of the optical axis L of the first and second scanning lenses 61 and 62, and the other travels on the other side in the sub-scanning section, in other words the incident beam travels on the opposite side of the optical axis L than the side traveled by scanning beam in the sub-scanning section;
(5) the first and second scanning lenses 61 and 62 can be tilted in the sub-scanning section; and
(6) the entrance surface 61a and the exit surface 61b of the first scanning lens 61 and the entrance surface 62a and the exit surface 62b of the second scanning lens 62 can be concave toward the light deflector 5 in the sub-scanning section.

Other configuration and optical operations are substantially the same as those in exemplary embodiment 1.

In FIGS. 6 and 7, reference numeral 19 is a light source device (e.g., one having a single light emitter). Reference numeral 6b denotes an imaging optical system. The imaging optical system 6b can have three (first, second, and third) scanning lenses (imaging lenses). The first and second scanning lenses 61 and 62 are formed of glass or a material having properties similar to glass. The entrance surface 61a and the exit surface 61b of the first scanning lens 61 and the entrance surface 62a and the exit surface 62b of the second scanning lens 62 can be concave toward the light deflector 5 in the sub-scanning section.

Figure 8:
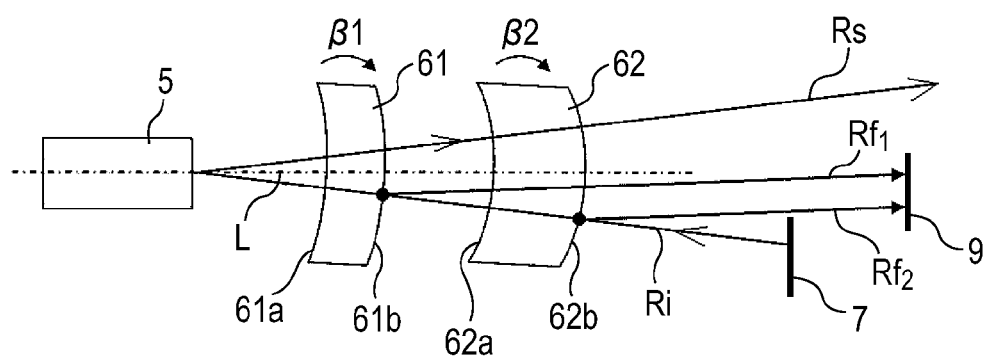
FIG. 8 illustrates ghost light in exemplary embodiment 2.

FIG. 8 illustrates an enlarged view of the first and second scanning lenses 61 and 62 and their vicinity in FIG. 7.

In the present exemplary embodiment, one of the principal ray of the incident beam Ri and the principal ray of the scanning beam Rs travels on one of the upper and lower sides of the optical axis L of the first and second scanning lenses 61 and 62, and the other travels on the other side. In the present exemplary embodiment, the first and second scanning lenses 61 and 62 can be tilted at an angle β (or at angles β1 and β2, respectively), in the sub-scanning section. The incident beam Ri passes through first the second scanning lens 62 then the first scanning lens 61. The incident beam Ri is partially reflected by the lens surface 62b to generate ghost light Rf2. When the incident beam Ri passes through the first scanning lens 61, it is also partly reflected by the lens surface 61b to generate ghost light Rf1. The tilt of lenses makes the ghost light Rf1-2 and the scanning beam Rs distant from each other. A portion of the ghost light Rf1-2 can be blocked by the light blocking member 9 and prevented from being incident on a photosensitive drum (not shown).

Comparative Examples

Figure 9A:
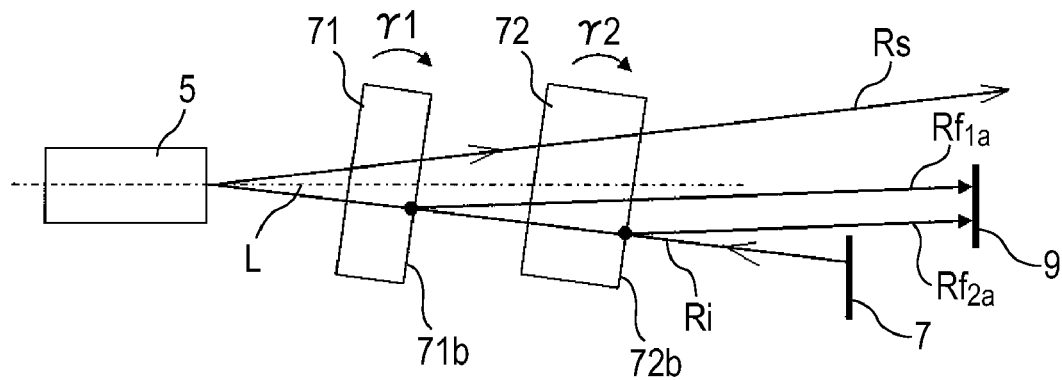
FIGS. 9A and 9B illustrate the shapes and angles of lenses in comparative examples.
Figure 9B:
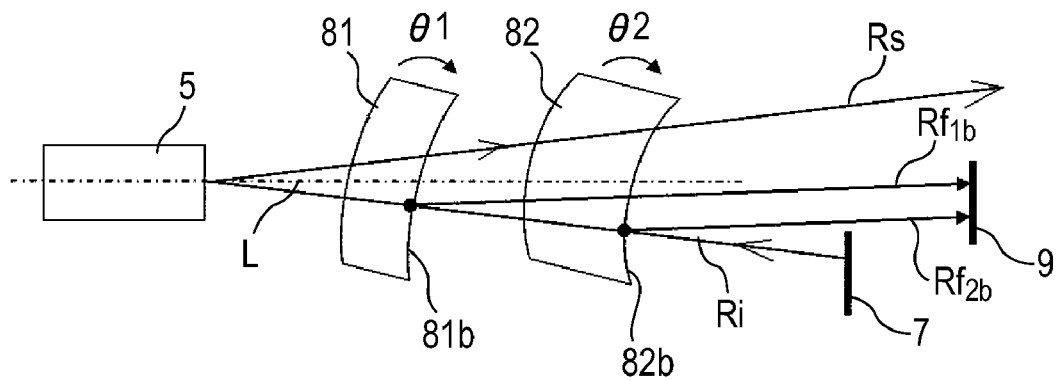
Figure 10:
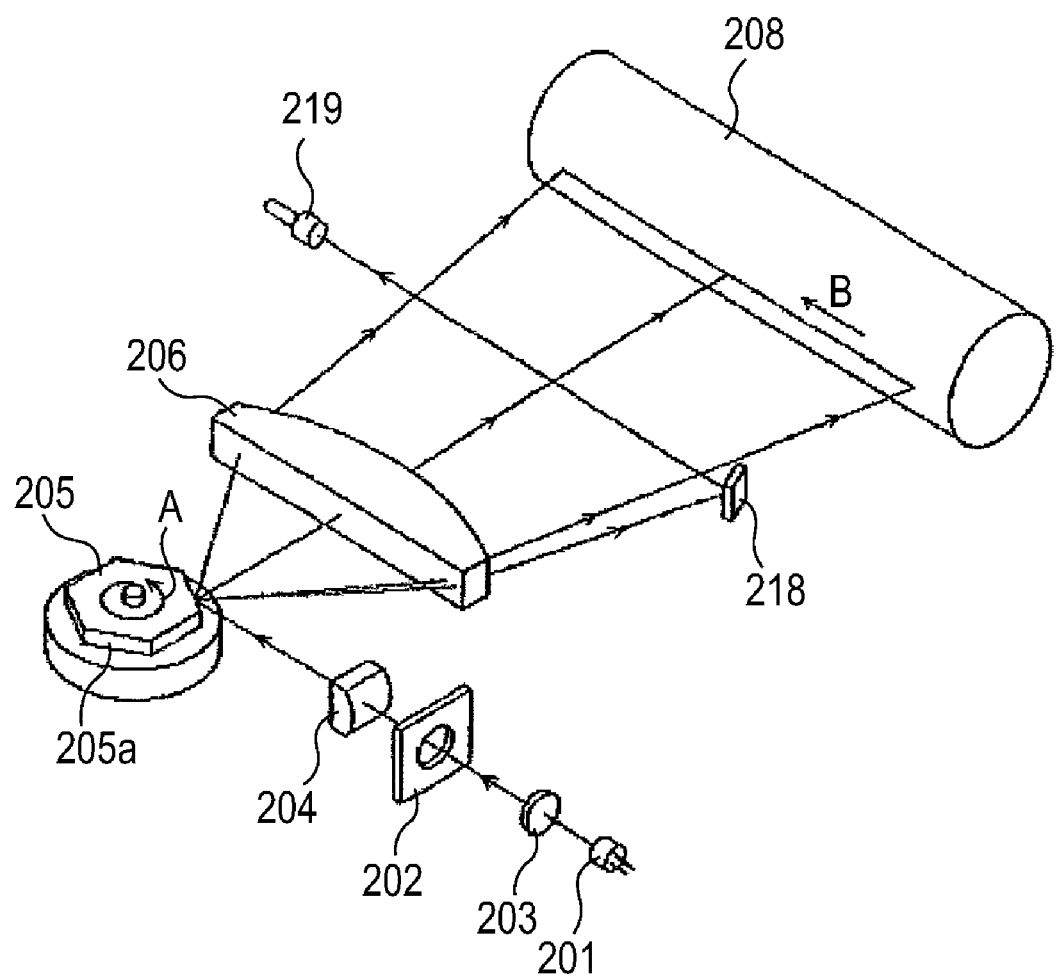
FIG. 10 illustrates a schematic perspective view of a conventional optical scanner.
Figure 11:
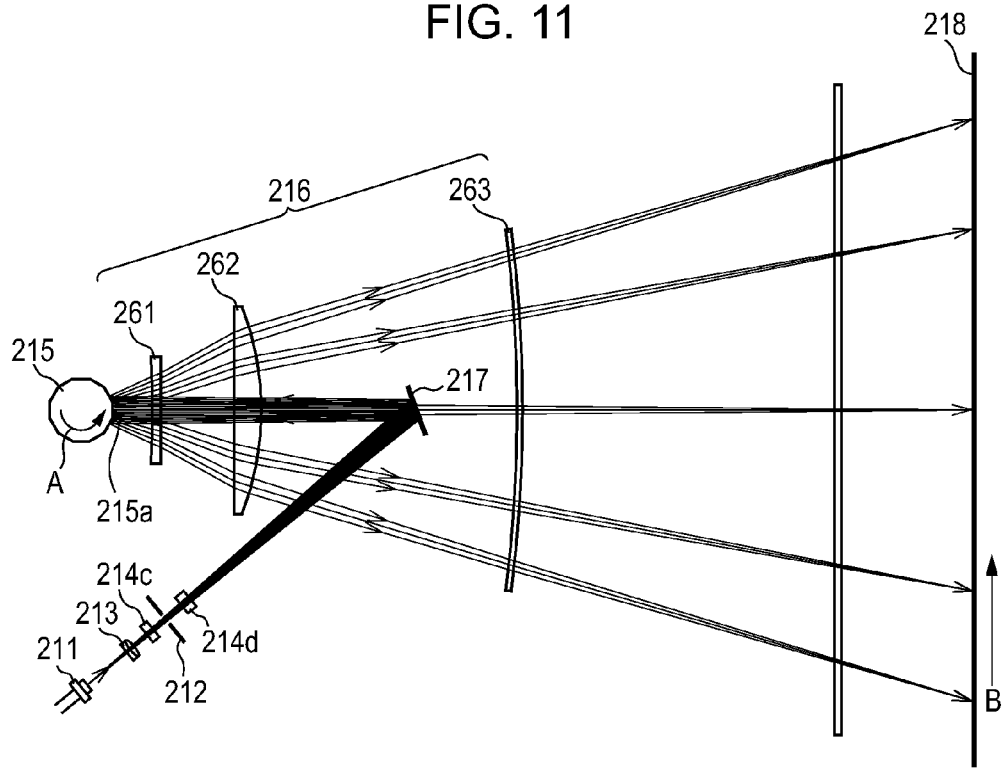
FIG. 11 illustrates a main scanning sectional view of a conventional optical scanner.
Figure 12:
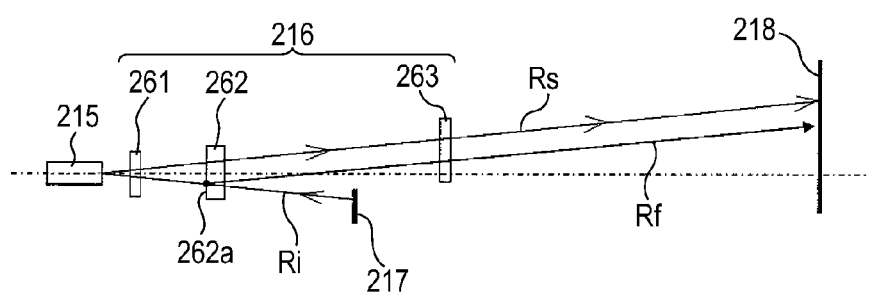
FIG. 12 illustrates a sub-scanning sectional view of the conventional optical scanner.

FIGS. 9A and 9B illustrate sub-scanning sectional views showing comparative examples of exemplary embodiments. In FIG. 9A, the entrance surfaces and the exit surfaces of the first and second scanning lenses 71 and 72 are flat. In addition, the first and second scanning lenses 71 and 72 are tilted at an angle γ (or at angles γ1 and γ2, respectively), in the sub-scanning section. In FIG. 9B, the entrance surfaces and the exit surfaces of the first and second scanning lenses 81 and 82 are convex toward the light deflector (polygon mirror) 5. In addition, the first and second scanning lenses 81 and 82 are tilted at an angle θ (or at angles θ1 and θ2, respectively), in the sub-scanning section.

The incident beam Ri passes through first the second scanning lens (e.g., 72, 82) then the first scanning lens (e.g., 71, 81). The incident beam Ri is partially reflected by the lens surface 72b or 82b to generate ghost light Rf2a and Rf2b respectively. When the incident beam Ri passes through the first scanning lens (71, 81), it is partly reflected by the lens surface (71b, 81b) to generate ghost light Rf1a and Rf1b respectively. As in the present exemplary embodiment, the comparative examples can also make the ghost light Rf (e.g., Rf1a, Rf1b, Rf2a, Rf2b) and the scanning beam Rs distant from each other. However, flare light incident on the photosensitive drum cannot be sufficiently separated from the scanning beam Rs.

Concerning the tilt angle of the first and second scanning lenses in the sub-scanning section, the tilt angle in FIG. 8 (β), the tilt angle in FIG. 9A (y), and the tilt angle in FIG. 9B (θ) can satisfy the following condition:

β<γ<θ in order to make the ghost light Rf and the scanning beam Rs distant from each other as much as in FIG. 8. If the tilt angle is too large, other problems occur. For example, the spot rotates on the surface to be scanned. Therefore, the shape of the first and second scanning lenses 61 and 62 shown in FIG. 8 is one possible shape that facilitates a smaller tilt angle of the first and second scanning lenses in the sub-scanning section.

In the present exemplary embodiment, in the main scanning section, the entrance surfaces and the exit surfaces of the first and second scanning lenses 61 and 62 are concave toward the light deflector 5 as shown in FIG. 6, therefore, each lens surface of the first and second scanning lenses 61 and 62 is barrel-shaped.

In the exemplary embodiment illustrated in FIG. 8, the entrance surface 61a and the exit surface 61b of the first scanning lens 61 and the entrance surface 62a and the exit surface 62b of the second scanning lens 62 are concave toward the light deflector (polygon mirror) 5 in the sub-scanning section. However, exemplary embodiments are not limited to this. Any scanning lens system having at least one lens surface that is concave toward the light deflector will do.

In at least one exemplary embodiment, both the first and second scanning lenses 61 and 62 are tilted. However, exemplary embodiments are not limited to this. Alternatively, either the first or second scanning lens 61 or 62 may be tilted. As described above, when both the incident beam and the scanning beam pass through a scanning lens, the scanning lens has a double pass. In at least one exemplary embodiment, both the first and second scanning lenses 61 and 62 have a double path. However, exemplary embodiments are not limited to this. Alternatively, an imaging optical system 6b in which only the first scanning lens 61 has a double path will do.

Image Forming Apparatus

Figure 13:
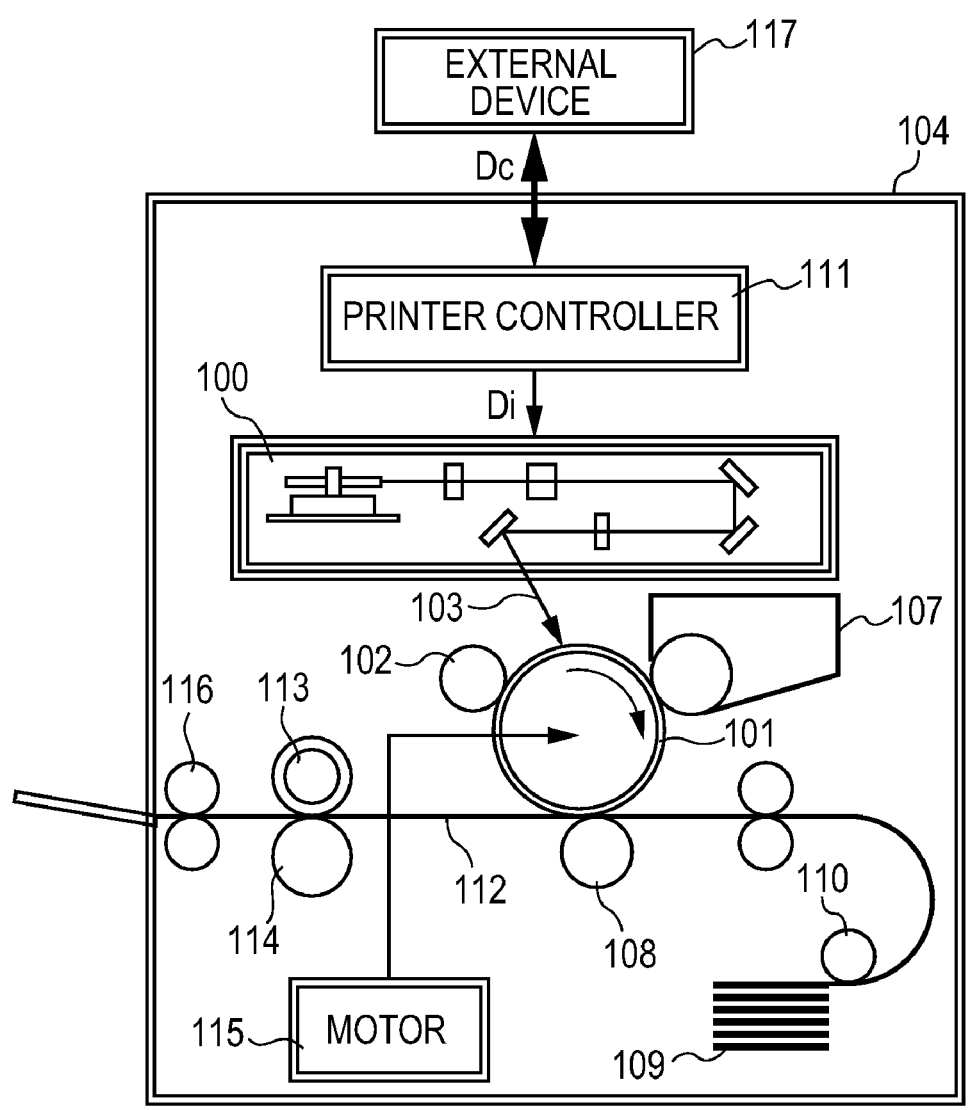
FIG. 13 illustrates a sub-scanning sectional view of an image forming apparatus according to an exemplary embodiment.

FIG. 13 illustrates a schematic sectional view in the sub-scanning direction, showing an exemplary embodiment of an image forming apparatus. In FIG. 13, reference numeral 104 denotes the image forming apparatus. Into this image forming apparatus 104, code data Dc is input from an external device 117 (e.g., a personal computer). This code data Dc is converted into image data (dot data) Di by a printer controller 111 in the apparatus. This image data Di is input into an optical scanning unit 100 according to exemplary embodiments 1 or 2. This optical scanning unit 100 emits a light beam 103, which is modulated according to the image data Di. With this light beam 103, the optical scanning unit 100 scans a photosensitive surface of a photosensitive drum 101 in the main scanning direction.

The photosensitive drum 101, which is an electrostatic-latent-image carrier (photoreceptor), is clockwise rotated by a motor 115. With this rotation, the photosensitive surface of the photosensitive drum 101 moves relative to the light beam 103 in the sub-scanning direction, which is perpendicular to the main scanning direction. A charging roller 102 is disposed above the photosensitive drum 101, and it is in contact with the surface of the photosensitive drum 101. The charging roller 102 uniformly charges the surface of the photosensitive drum 101. The surface of the photosensitive drum 101 charged by the charging roller 102 is then scanned by the optical scanning unit 100 with the light beam 103.

As described above, the light beam 103 is modulated according to the image data Di. Irradiation by the light beam 103 forms an electrostatic latent image on the surface of the photosensitive drum 101. This electrostatic latent image is developed into a toner image by a developer 107. The developer 107 is disposed downstream in the rotation direction of the photosensitive drum 101 from the position irradiated with the light beam 103, and it is in contact with the photosensitive drum 101.

The toner image developed by the developer 107 is transferred onto a recording medium, more specifically a sheet 112 of paper, by a transferring roller 108. The transferring roller 108 is disposed below the photosensitive drum 101 and faces the photosensitive drum 101. The sheets are contained in a sheet cassette 109 in front of the photosensitive drum 101 (on the right side of FIG. 13). The sheets 112 can also be fed manually. A sheet feeding roller is disposed at one end of the sheet cassette 109, and it feeds the sheets 112 contained in the sheet cassette 109 into a sheet path.

The toner image is thus transferred onto the sheet 112, and the sheet 112 with the unfixed toner image thereon is then carried to a fuser behind the photosensitive drum (on the left side of FIG. 13). The fuser includes a fusing roller 113 having a fusing heater (not shown) therein, and a pressing roller 114 pressed against the fusing roller 113. The sheet 112 is carried from the transferring roller 108 to the fuser, and the fuser presses and heats the sheet between the fusing roller 113 and the pressing roller 114 so as to fix the unfixed toner image to the sheet 112. A sheet-discharging roller 116 is disposed behind the fusing roller 113. The sheet-discharging roller 116 discharges the sheet 112 with the fixed toner image from the image forming apparatus.

Although not shown in FIG. 13, the printer controller 111 not only converts data as described above, but can also control the motor 115, other units in the image forming apparatus, and a polygon motor in the optical scanning unit.

The recording density of the image forming apparatus used in exemplary embodiments is not limited. However, considering that the higher the recording density, the higher the required image quality is, exemplary embodiments 1 and 2 facilitate the formation of an image forming apparatus that has a recording density of 1200 dpi or more.

Color Image Forming Apparatus

Figure 14:
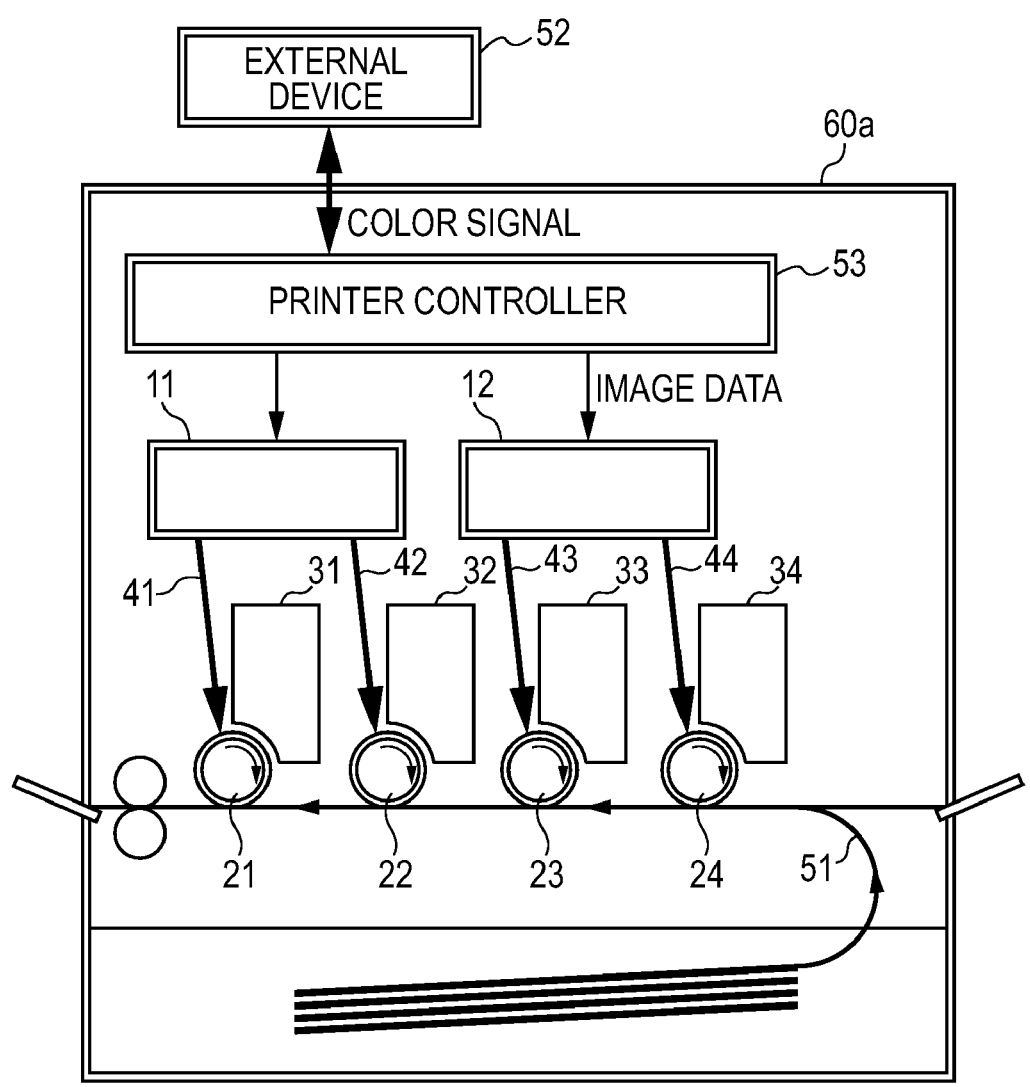
FIG. 14 illustrates a schematic view of a color image forming apparatus according to an exemplary embodiment.
Figure 15:
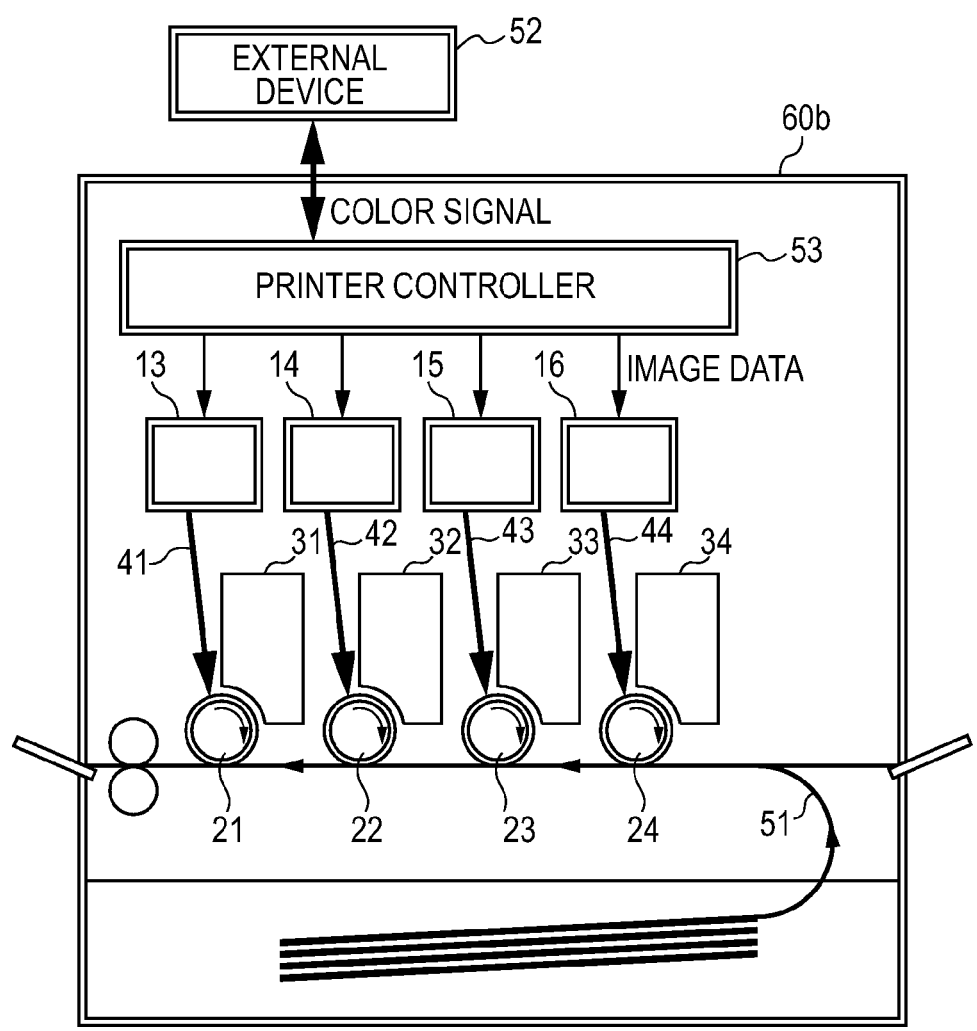
FIG. 15 illustrates a schematic view of another color image forming apparatus according to another exemplary embodiment.

FIGS. 14 and 15 illustrate schematic views of color image forming apparatuses incorporating optical scanners of exemplary embodiments. FIG. 14 shows a tandem-type color image forming apparatus including an array of two optical scanners of exemplary embodiment 1, the optical scanners recording image information in parallel on the surfaces of photosensitive drums as image carriers. FIG. 15 illustrates a tandem-type color image forming apparatus including an array of four optical scanners of exemplary embodiment 2, the scanners recording image information in parallel on the surfaces of photosensitive drums as image carriers. Reference numeral 60a denotes the color image forming apparatus illustrated in FIG. 14, while reference numeral 60b denotes the color image forming apparatus illustrated in FIG. 15; reference numerals 11 and 12 denote the optical scanners according to exemplary embodiment 1; reference numerals 13, 14, 15, and 16 denote the optical scanners according to exemplary embodiment 2; reference numerals 21, 22, 23, and 24 denote the photosensitive drums as image carriers; reference numerals 31, 32, 33, and 34 denote developers; and reference numeral 51 denotes a conveyer belt.

In FIGS. 14 and 15, color signals of R (red), G (green), and B (blue) are input into the color image forming apparatus (e.g., 60a and 60b) from an external device 52 (e.g., a personal computer). These color signals are converted into image data (dot data) of C (cyan), M (magenta), Y (yellow), and B (black) by a printer controller 53 in the apparatus. These image data are input into the optical scanners 11 and 12 (or the optical scanners 13, 14, 15, and 16). These optical scanners emit light beams 41, 42, 43, and 44, which are modulated according to the image data. The photosensitive surfaces of the photosensitive drums 21, 22, 23, and 24 are scanned with the light beams in the main scanning direction.

The color image forming apparatus of the present exemplary embodiment has an array of two (or four) optical scanners 11 and 12 (or 13, 14, 15, and 16) corresponding to C (cyan), M (magenta), Y (yellow), and B (black). The optical scanners record image signals (image information) in parallel on the surfaces of the photosensitive drums 21, 22, 23, and 24 to print a color image at higher speed than one drum-type color image forming apparatus of FIG. 13.

In the color image forming apparatus of the present exemplary embodiment, the two (or four) optical scanners 11 and 12 (or 13, 14, 15, and 16) form latent images of C, M, Y, and B on the surfaces of the corresponding photosensitive drums 21, 22, 23, and 24 using light beams based on the image data. Next, multiple transfer to a recording medium is performed so as to form a full-color image.

The external device 52 may also be, for example, a color image scanner (e.g., one having a CCD sensor). In this case, the color image scanner and the color image forming apparatus (e.g., 60a and 60b) constitute a color digital photocopier.

In exemplary embodiments the term electrophotographic process can include a laser beam printer, a digital photocopier, or a multifunction printer, in which a light beam optically modulated and emitted from a light source device is reflected and deflected by a polygon mirror as a deflecting device, and then a surface to be scanned is scanned with the light beam through a scanning optical system so as to record image information.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An optical scanner comprising:
a light source device;
a deflecting device;
a first optical system configured to guide an incident beam emitted from the light source device to the deflecting device; and
a second optical system configured to guide a scanning beam deflected by the deflecting device to a surface to be scanned, the incident beam being a beam following a light path between the light source device and the deflecting device, and the scanning beam being a beam following a light path between the deflecting device and the surface to be scanned,
wherein the second optical system includes at least one imaging optical element,
wherein the incident beam passes through the at least one imaging optical element constituting the second optical system, and is obliquely incident on a deflecting surface of the deflecting device in a sub-scanning section,
wherein both the principal ray of the incident beam and the principal ray of the scanning beam travels on the opposite side with each other with respect to the optical axis of all of the at least one imaging optical element constituting the second optical system through which the incident beam passes in a sub-scanning section,
wherein both the entrance surface and the exit surface of all of the at least one imaging optical element constituting the second optical system through which the incident beam passes are concave toward the deflecting device in the sub-scanning section, and
wherein all of the at least one imaging optical element constituting the second optical system through which the incident beam passes is tilted in the sub-scanning section, and a light blocking member is provided, the light blocking member configured to block a ghost beam passing between the incident beam and the scanning beam, the ghost beam being generated as the incident beam is reflected by the entrance surface or the exit surface of the imaging optical element when the incident beam passes through the imaging optical element in the sub-scanning section.

2. An image forming apparatus comprising:
a photoreceptor disposed on a surface to be scanned;
the optical scanner according to claim 1, the optical scanner scanning the photoreceptor with a light beam to form an electrostatic latent image;
a developer developing the latent image into a toner image;
a transferor transferring the developed toner image onto a recording medium; and
a fuser fusing the transferred toner image to the recording medium.

3. An image forming apparatus comprising:
the optical scanner according to claim 1; and
a printer controller that converts code data input from an external device into an image signal and inputs the image signal into the optical scanner.

* * * * *